US012413012B2

(12) United States Patent
Soldo

(10) Patent No.: US 12,413,012 B2
(45) Date of Patent: Sep. 9, 2025

(54) EXPLOSION-PROOF FITTING FOR ANTENNAS, CENTRAL ASSEMBLY FOR AN EXPLOSION-PROOF FITTING FOR ANTENNAS, AND EXPLOSION-PROOF BOX

(71) Applicant: SOLEXY S.R.L. UNINOMINALE, Desenzano del Garda (IT)

(72) Inventor: Giovanni Soldo, Desenzano del Garda (IT)

(73) Assignee: SOLEXY S.R.L. UNINOMINALE, Desenzano del Garda (IT)

( * ) Notice: Subject to any disclaimer, the term of this patent is extended or adjusted under 35 U.S.C. 154(b) by 325 days.

(21) Appl. No.: 18/216,729

(22) Filed: Jun. 30, 2023

(65) Prior Publication Data

US 2024/0014593 A1 Jan. 11, 2024

(30) Foreign Application Priority Data

Jul. 5, 2022 (IT) ........................ 102022000014221

(51) Int. Cl.
*H01R 13/533* (2006.01)
*H01R 13/50* (2006.01)
(Continued)

(52) U.S. Cl.
CPC ........... *H01R 13/533* (2013.01); *H01R 24/50* (2013.01); *H01R 24/52* (2013.01); *H01R 24/542* (2013.01);
(Continued)

(58) Field of Classification Search
CPC ...... H01R 13/533; H01R 24/50; H01R 24/52; H01R 24/542; H01P 1/20; H01Q 1/002
(Continued)

(56) References Cited

U.S. PATENT DOCUMENTS 6,249,415 B1 * 6/2001 Daoud ...................... H01T 1/14 361/103
7,014,502 B2 * 3/2006 Rasmussen .......... H01Q 1/1207 439/578

(Continued)

FOREIGN PATENT DOCUMENTS

IT 201800005206 U1 6/2020
IT 201800021403 A1 6/2020
IT 201900001079 A1 7/2020

OTHER PUBLICATIONS

Search Report for IT102022000014221 dated Feb. 7, 2023, The Hague, NL.

*Primary Examiner* — Hae Moon Hyeon
(74) *Attorney, Agent, or Firm* — ArentFox Schiff LLP; Michael Fainberg

(57) ABSTRACT

An explosion-proof fitting for antennas suitable for connecting an antenna in hazardous areas is provided. The explosion-proof fitting has a housing defining a cavity between a first end and a second end, an antenna attachment at the first end and a radio attachment at said second end, and a central assembly accommodated in the cavity. The central assembly has a capacitive blocking circuit connected to the antenna attachment and the radio attachment, and a shielding casing running about the capacitive blocking circuit and remaining at least partially spaced apart for capacitive blocking circuit and from the housing. A sealing compound is arranged between the shielding casing and the housing. A central assembly for an explosion-proof fitting, and an explosion-proof box including the explosion-proof fitting are also provided.

19 Claims, 8 Drawing Sheets

(51) Int. Cl.

| | |
|---|---|
| ***H01R 13/52*** | (2006.01) |
| ***H01R 24/50*** | (2011.01) |
| ***H01R 24/52*** | (2011.01) |
| ***H01R 24/54*** | (2011.01) |
| *H01R 13/66* | (2006.01) |
| *H01R 103/00* | (2006.01) |

(52) U.S. Cl.
CPC ........ *H01R 13/665* (2013.01); *H01R 2103/00* (2013.01); *H01R 2201/02* (2013.01)

(58) Field of Classification Search
USPC .................................... 439/63, 578; 343/906
See application file for complete search history.

(56) References Cited

U.S. PATENT DOCUMENTS

| | | | | |
|---|---|---|---|---|
| 7,057,577 | B1 | 6/2006 | Willoughby et al. | |
| 8,842,049 | B2 * | 9/2014 | Anand | H01Q 1/241 343/702 |
| 9,190,837 | B2 * | 11/2015 | Tollefsbol | H05K 9/0037 |
| 10,027,067 | B2 * | 7/2018 | Peters | H01R 13/6666 |
| 10,193,335 | B2 * | 1/2019 | Plass | H01T 4/08 |
| 2003/0083038 | A1 * | 5/2003 | Poon | H05K 5/06 455/344 |
| 2009/0081963 | A1 * | 3/2009 | Boren | H01Q 21/30 455/90.1 |

* cited by examiner

EXPLOSION-PROOF FITTING FOR ANTENNAS, CENTRAL ASSEMBLY FOR AN EXPLOSION-PROOF FITTING FOR ANTENNAS, AND EXPLOSION-PROOF BOX

CROSS-REFERENCE TO RELATED APPLICATION

This application claims priority to Italian Patent Application No. 102022000014221 filed on Jul. 5, 2022, the contents of which are incorporated by reference in their entirety.

FIELD OF THE INVENTION

The present invention relates to a fitting for connecting an antenna. More specifically, the present invention relates to an explosion-proof fitting for connecting an antenna to a casing for electrical circuits in an environment with the presence of a hazardous area, such as an explosion-proof box, a casing for safety areas, or an electrical conduit.

BACKGROUND OF THE INVENTION

The installation of electrical equipment in environments with the presence of hazardous areas, e.g., areas at risk of explosion, requires the potential suppression of any hazardous electrical impulse intended to cross the electrical equipment, and the insertion of the electrical equipment into an explosion-proof box for withstanding the maximum force provided during an explosion.

In such an environment, the use is known of a capacitive blocking circuit inside the explosion-proof box (i.e., the safe area) for providing an inherent safety barrier or a complete burying of the antenna in a suitable sealing compound for hazardous areas is known. Disadvantageously, these methods are poorly flexible since they do not allow replacing the antenna quickly and easily. In fact, it is necessary to replace the whole antenna incorporated in the sealing compound (and any sealing fittings installed adjacent to the antenna). This is both costly and time-consuming.

Italian patents IT201900001079, IT201800021403 and Italian utility model IT201800005206 disclose a solution of an explosion-proof fitting for connecting an antenna to a casing for electrical circuits in an environment with the presence of a hazardous area. In such documents, the explosion-proof fitting consists of an outer housing delimiting an inner cavity, in which a capacitive blocking circuit is accommodated, the capacitive blocking circuit being immersed in a sealing compound, which acts as a dielectric and protects the components from humidity.

Disadvantageously, such a type of explosion-proof fitting has several drawbacks. In fact, the sealing compound, generally resin, can cause an alteration of the passive filtering properties when it comes into contact with the capacitive blocking circuit.

Moreover, the explosion-proof fitting of the prior art is poorly suited to accommodate flexible printed circuits, since it requires complicated operations for fastening the circuit to the fitting during the assembly or complicated fastening contrivances inside the fitting.

SUMMARY OF THE INVENTION

Therefore, the need is felt for an explosion-proof fitting for connecting an antenna in an environment with the presence of a hazardous area, capable of overcoming the drawbacks of the prior art and maintaining the performance of a radio system to which the antenna is connected.

In particular, the need is felt for a fitting adapted to generate a signal shielding by simultaneously maintaining the sealing properties provided by the sealing compound, while keeping the passive design filtering properties of the capacitive blocking circuit unaltered.

This is obtained by an explosion-proof fitting for antennas, a central assembly for an explosion-proof fitting for antennas, and an explosion-proof box as described and claimed herein. Preferred constructional variants, implying further advantageous aspects are also described.

BRIEF DESCRIPTION OF THE FIGURES

The subject of the present invention will now be described in detail, with the aid of the accompanying drawings, in which.

DETAILED DESCRIPTION

With reference to the accompanying figures, an explosion-proof fitting for antennas for connecting an antenna 12 in applications in hazardous areas, e.g., for the connection with an explosion-proof box 14 or an electrical conduit in a hazardous area.

Figure 1:
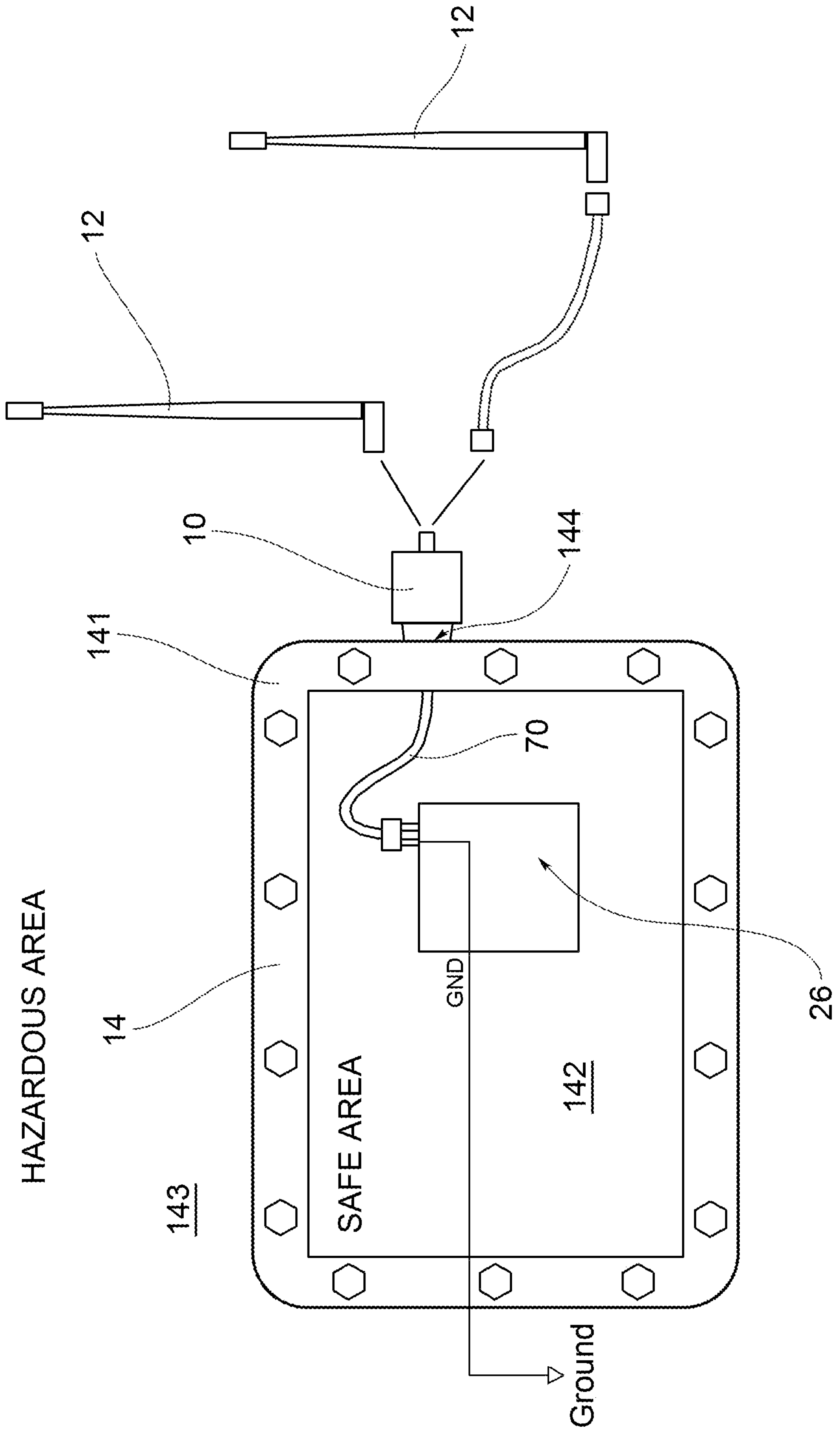
FIG. 1 is a diagrammatic view of an application of an explosion-proof fitting for antennas made according to the present invention, applied to an explosion-proof box in a hazardous area.

As discussed in greater detail below, FIG. 1 shows an example of an application of the explosion-proof fitting 10 for antennas in a hazardous area.

With reference to FIG. 1, the area inside the explosion-proof box 14 represents an electrically safe area, while the area outside the explosion-proof box 14 represents an environment with an electrically hazardous area classification. Therefore, the box 14 is an explosion-proof box 14 for use in an environment comprising electrically hazardous areas. As shown in FIG. 1, a standard antenna 12 can be directly mounted to the explosion-proof box 14 by means of the explosion-proof fitting 10.

The antenna 12 is preferably directly connected to a radio unit 26 inside the explosion-proof box 14 through the explosion-proof fitting 10, without crossing a separate capacitive blocking circuit arranged inside the hazardous area, which is generally used, instead, in the prior art for ensuring an inherently safe barrier. This is due to the fact that, as described hereinbelow in greater detail, the explosion-proof fitting 10 includes a capacitive blocking circuit 44 providing an inherently safe barrier for suppressing an electrical impulse which can potentially travel through the fitting along the radio frequency signal conductor. The radio unit 26 receives power from an external power supply (not shown).

Figure 2:
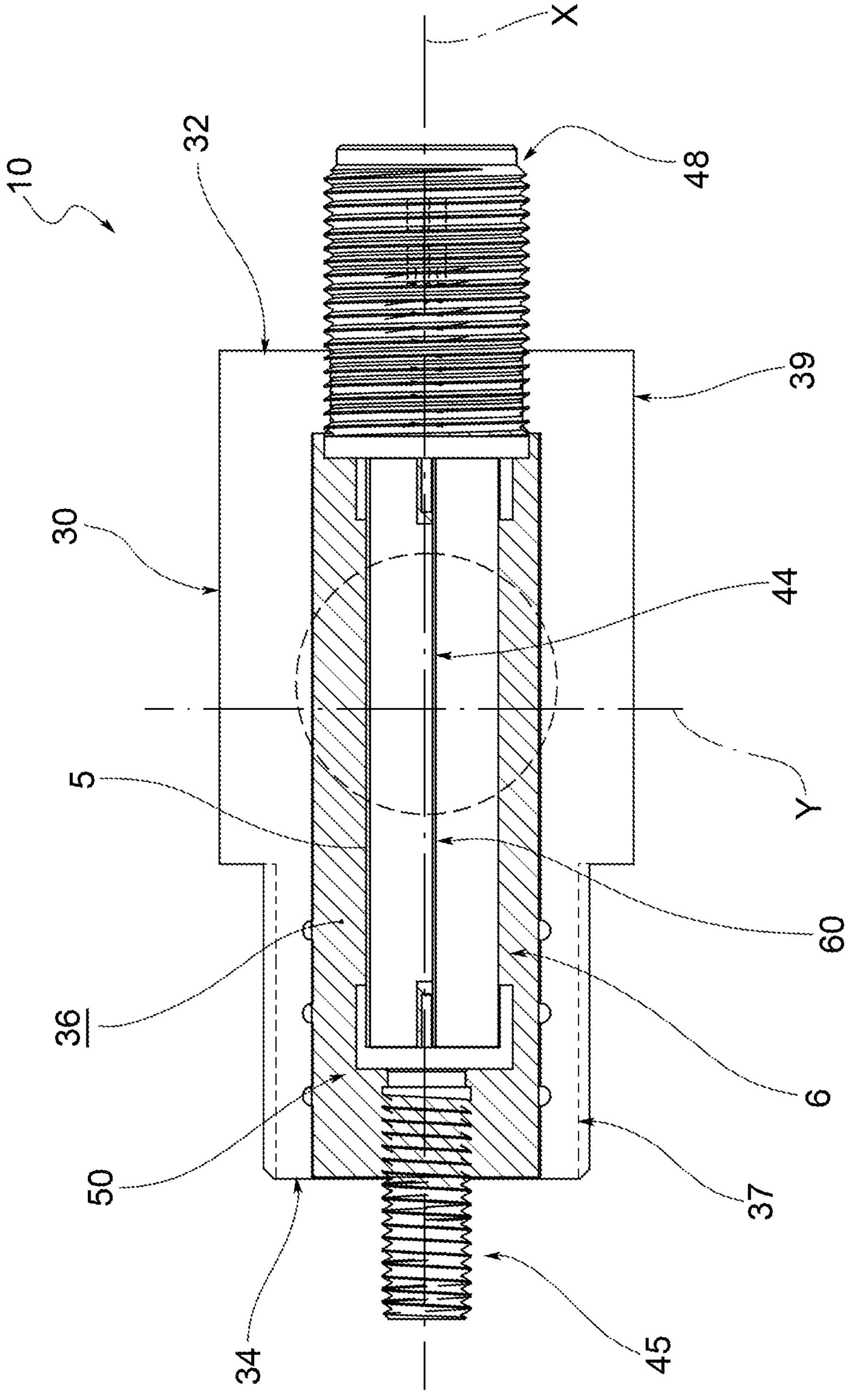
FIG. 2 is a section view of an explosion-proof fitting for antennas made according to an embodiment of the present invention.
Figure 2A:
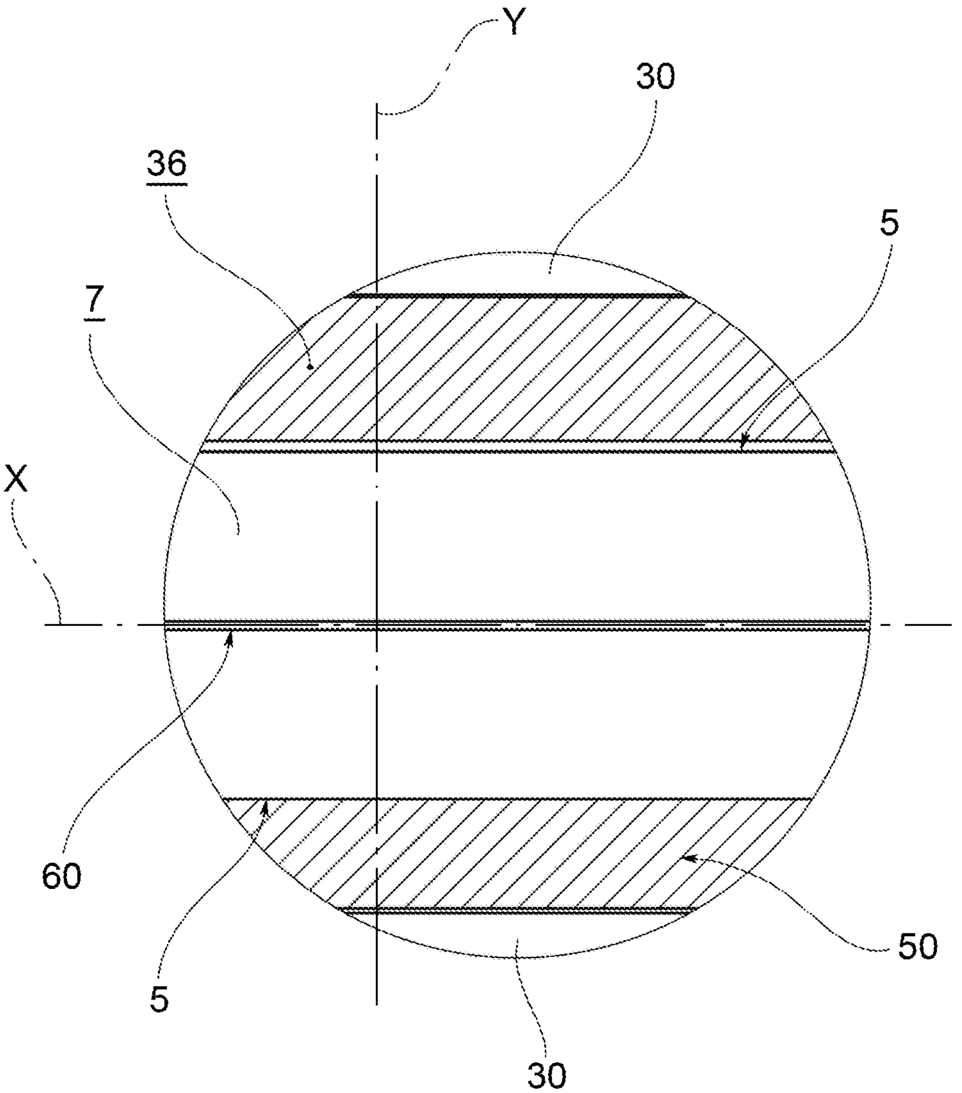
FIG. 2*a* shows a zoomed in detail of FIG. 2.

With reference to the example in FIG. 2, the explosion-proof fitting 10 for antennas comprises a housing 30, preferably a substantially cylindrical housing, which defines and extends between a first end 32 and a second 34 end. A cavity 36 is defined in the housing 30 between the first 32 and second 34 ends.

At the first end 32, the explosion-proof fitting 10 comprises an antenna attachment (or connector) 48.

Figure 8:
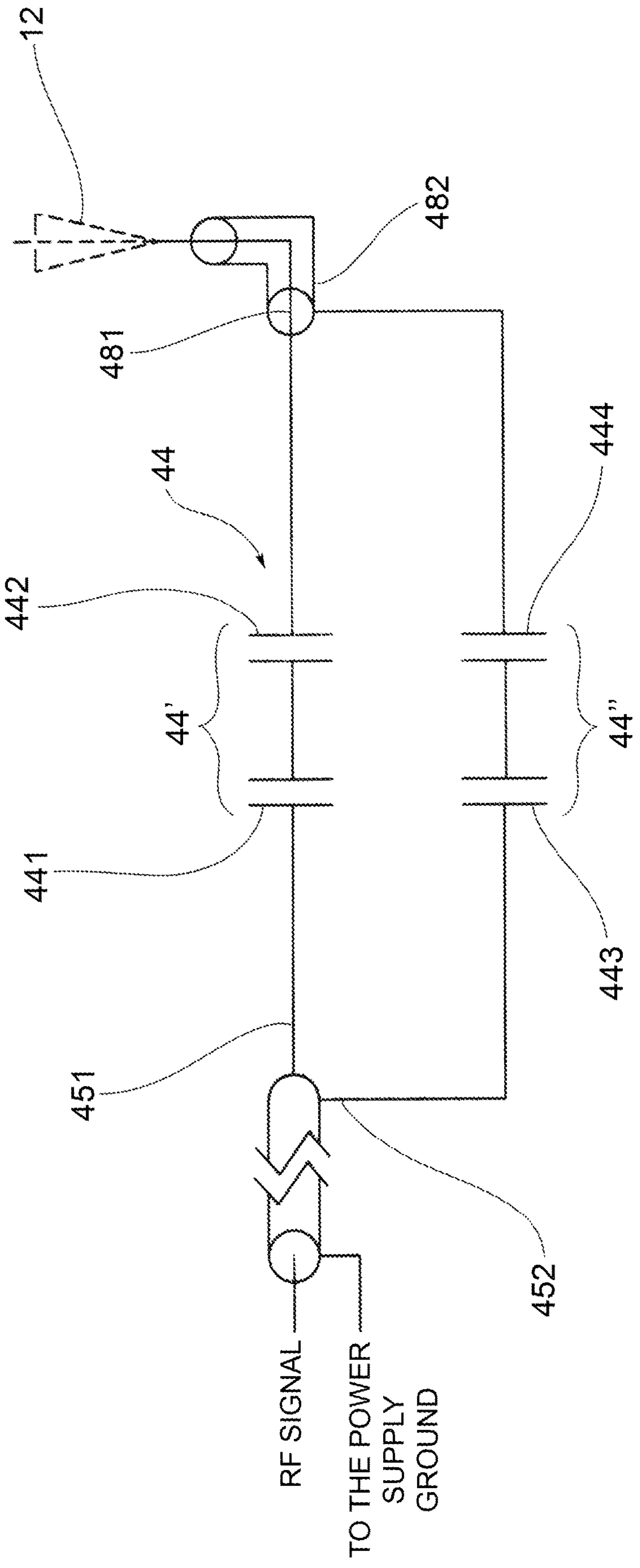
FIG. 8 shows a diagram of the electrical circuit of the explosion-proof fitting for antennas in an embodiment of the present invention.

The antenna attachment preferably comprises an antenna signal conductor 481 and an antenna return conductor 482 (see FIG. 8).

At the second end 34, the explosion-proof fitting 10 comprises a radio attachment (or connector) 45.

The radio attachment 45 preferably comprises an electrical signal conductor 451 and an electrical return conductor 452 (see FIG. 8).

Preferably, the radio attachment 45 is connected, preferably by means of the electrical return conductor 452, directly to the explosion-proof box 14, which is generally connected to ground, e.g., a power ground (as shown in FIG. 1, for example) and/or to the conductor of the power ground on the radio unit 26.

Moreover, the capacitive blocking circuit 44 is preferably directly connected to the electrical signal 451 and return 452 conductors, i.e., without any other intermediate electrical component, except for a simple conductor.

The electrical signal conductor 451 and the electrical return conductor 452 may be directly connected to the radio unit 26. According to the present invention, the explosion-proof fitting 10 further comprises a central assembly 6, extending along a main extension axis X between the antenna attachment 48 and the radio attachment 45. The central assembly 6 is accommodated in the cavity 36 and comprises a capacitive blocking circuit 44 electrically connected to the antenna attachment 48 and the radio attachment 45.

The central assembly 6 further comprises a shielding casing 5, running about said capacitive blocking circuit 44 along said main extension axis X and remaining spaced apart from the capacitive blocking circuit 44 at least along a transverse direction Y orthogonal to said main extension axis X, so that an interspace 7 between the shielding casing 5 and the capacitive blocking circuit 44 is formed.

Moreover, the central assembly 6 is accommodated in the cavity 36 so that the shielding casing 5, in turn, also remains spaced apart from the housing 30.

Preferably, the shielding casing 5 comprises a side wall running about and along the main extension axis X, having a plurality of sides, and the shielding casing 5 remains spaced apart from the housing 30 about the whole side wall, i.e., along all sides of the plurality of sides.

Inside the cavity 36, the explosion-proof fitting 10 comprises at least one sealing compound 50 which at least partially or completely encloses the central assembly 6. Preferably, the sealing compound completely fills the cavity 36.

In other words, the sealing compound 50 fills the space resulting between the shielding casing 5 and the housing 30 in the cavity 36.

Moreover, the central assembly 6 is preferably totally accommodated in the cavity 36.

In an embodiment of the present invention, the interspace 7 is filled with a gas, a gas mixture, or air. Advantageously, the gas or gas mixture or air allows keeping the passive filtering features of the capacitive blocking circuit substantially unaltered within the limits of the design tolerances.

Figure 3:
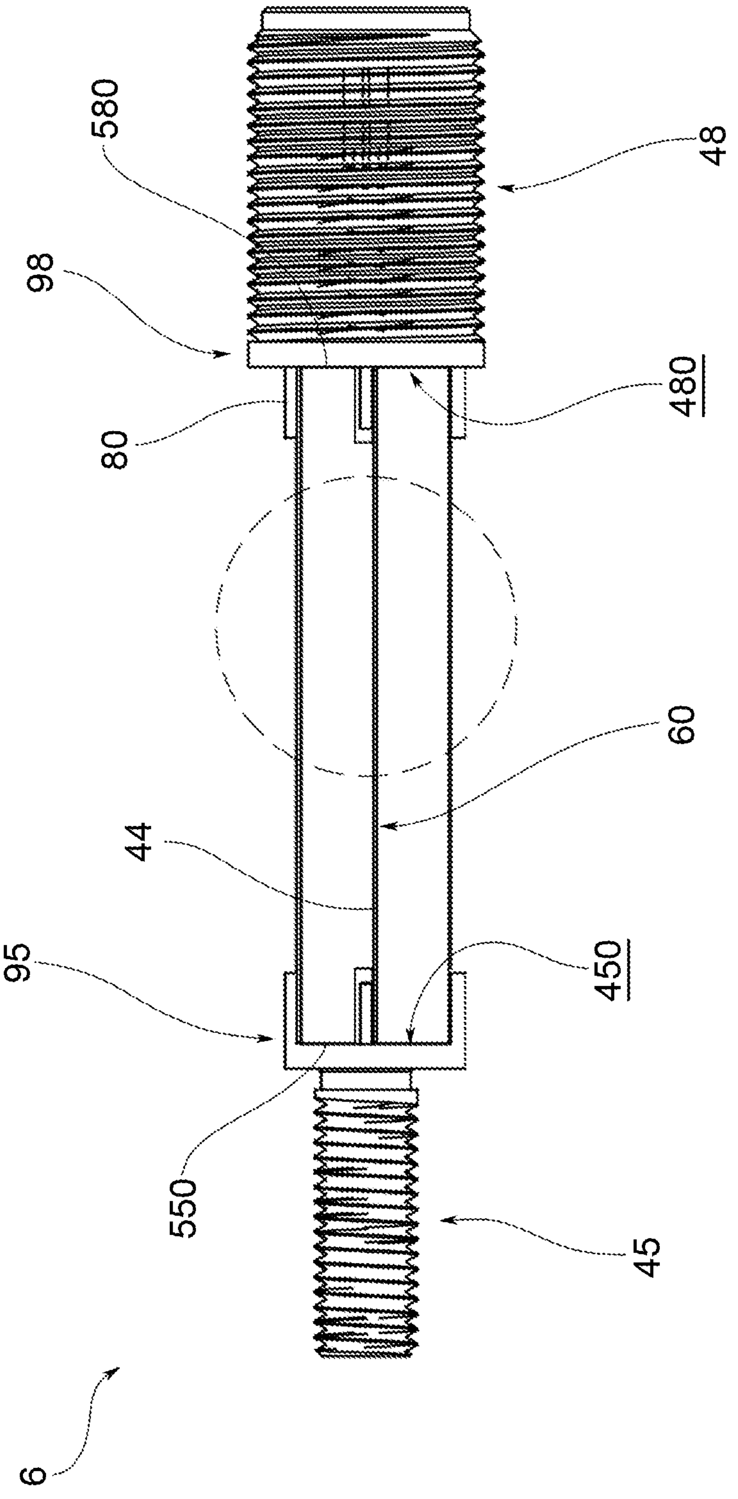
FIG. 3 is a section view of a central assembly for an explosion-proof fitting for antennas made according to an embodiment of the present invention.
Figure 3A:
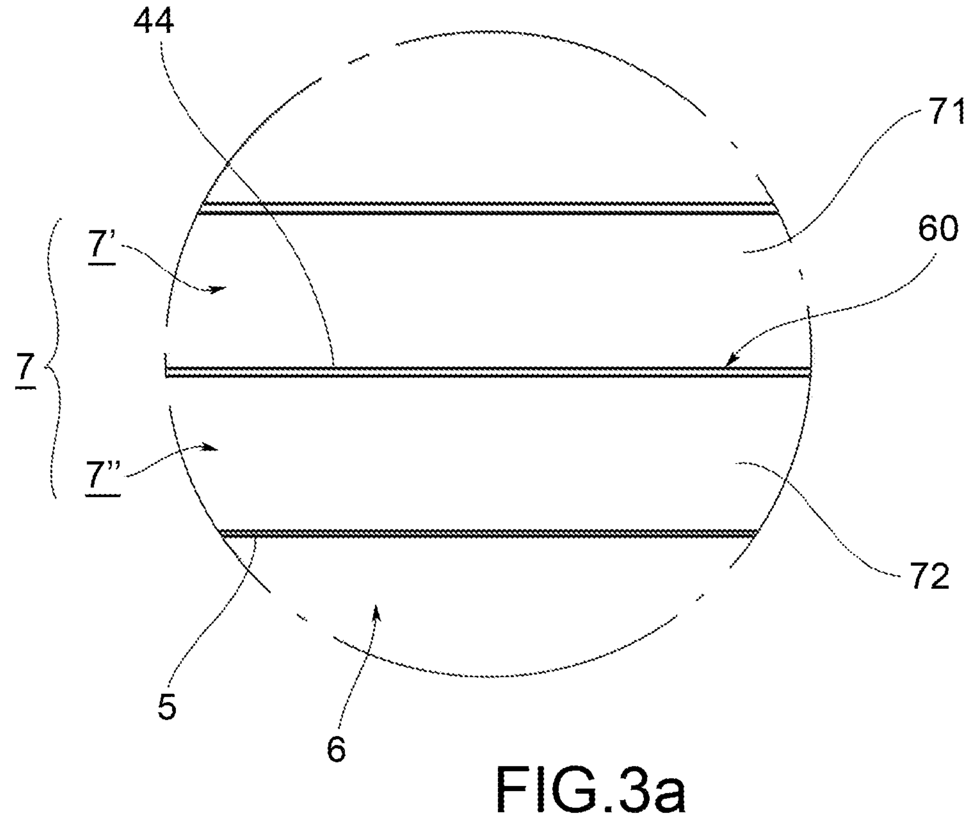
FIG. 3*a* is a detailed view of the central assembly for a fitting for antennas in FIG. 3.
Figure 4:
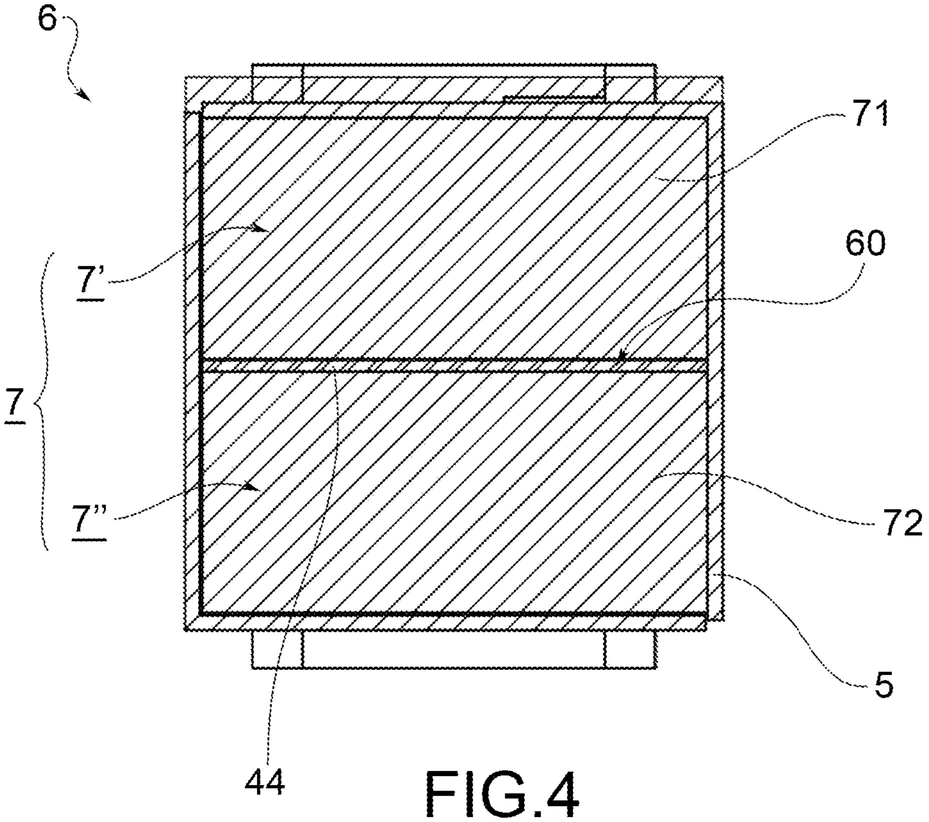
FIG. 4 is a cross-section view of the central assembly for a fitting for antennas in FIG. 3, cut with the plane A-A.

In an alternative embodiment of the present invention, for example with reference to the accompanying FIGS. 3*a* and 4, the explosion-proof fitting 10 comprises a filling material 71, 72 accommodated in the interspace, between the shielding casing 5 and the capacitive blocking circuit 44.

Preferably, the filling material 71, 72 is a material suited to not alter at least the passive filtering features of the capacitive circuit blocking 44, so as to keep the passive filtering features within the design filtering tolerances.

Even more preferably, the filling material 71, 72 is polytetrafluoroethylene (PTFE, also known as Teflon).

Alternatively, the filling material 71, 72 consists of a material selected from the group consisting of: polyethylene, polyamide, polypropylene, polystyrene, paper, mica, dioxide silicon, carbon sulfide, polyvinyl chloride (PVC) and bi-oriented polyethylene terephthalate (BoPET).

In a preferred embodiment, the filling material 71, 72 completely occupies the interspace 7.

In one embodiment, the filling material 71, 72 is liquid-based and adapted to solidify once inserted into the interspace 7.

In one embodiment of the present invention, the capacitive blocking circuit 44 divides the interspace 7 into a first half-space 7' and a second half-space 7" arranged on the side opposite to the first half-space 7' with respect to the capacitive blocking circuit 44 and the filling material 71, 72 consists of at least a first slat 71 arranged in the first half-space 7' and a second slat 72 arranged in the second half-space 7".

That is, in such an embodiment, the filling material 71, 72 is inserted directly into the interspace 7 in solid form, i.e., in the form of slats.

In a preferred embodiment, the shielding casing 5 is a bent metal sheet surrounding the capacitive blocking circuit 44.

Advantageously, the metal sheet efficiently shields the circuit while ensuring the insulation of the capacitive circuit with respect to the sealing compound, which is always outside the shielding casing 5.

Preferably, the metal sheet is bent about the capacitive blocking circuit, giving the shielding casing 5 a prismatic shape, even more preferably a rectangular parallelepiped shape. Such a shape facilitates assembling and producing the explosion-proof fitting.

More preferably, the shielding casing 5 is made of a copper-nickel-zinc alloy, and even more preferably of an alloy comprising a percentage of copper between 50% and 60%, a percentage of zinc between 15% and 30%, and a percentage of nickel from 10% to 30%. In other words, the shielding casing 5 is preferably made of German silver.

Advantageously, the German silver material has a good weldability and facilitates the production of the shielding casing 5, preferably in the form of metal sheet.

Moreover, preferably with reference to the embodiment in FIG. 4, the shielding casing 5 is at least partially in contact with a periphery of the capacitive blocking circuit 44.

In one embodiment of the present invention, the capacitive blocking circuit 44 comprises a first capacitive blocking circuit 44' connected between the electrical signal conductor 451 and the antenna signal conductor 481. The capacitive blocking circuit 44 further comprises a second capacitive blocking circuit 44" connected between the electrical return conductor 452 and the antenna return conductor 482.

Preferably, the first capacitive blocking circuit 44' comprises a first series of two capacitors 441, 442, and the second capacitive blocking circuit 44" comprises a second series of two capacitors 443, 444. In such embodiments, the first series of capacitors 441, 442 and the second series of capacitors 443, 444 only consist of a series of two capacitors each, thus providing a more compact solution.

In one embodiment, each capacitor 441, 442, 443, 444 of first capacitive blocking circuit 44' and second capacitive blocking circuit 44" has a capacity value between 10 and 68 pF. This allows obtaining an optimized tuning to reduce the signal loss and minimizing the interacting capacity between the protection circuit on the power supply and the electrical return conductor 452 (return circuit).

Preferably, each capacitor of the first capacitive blocking circuit 44' and the second capacitive blocking circuit 44" has a minimum Root Mean Square (RMS) voltage of 1500V.

Figure 5:
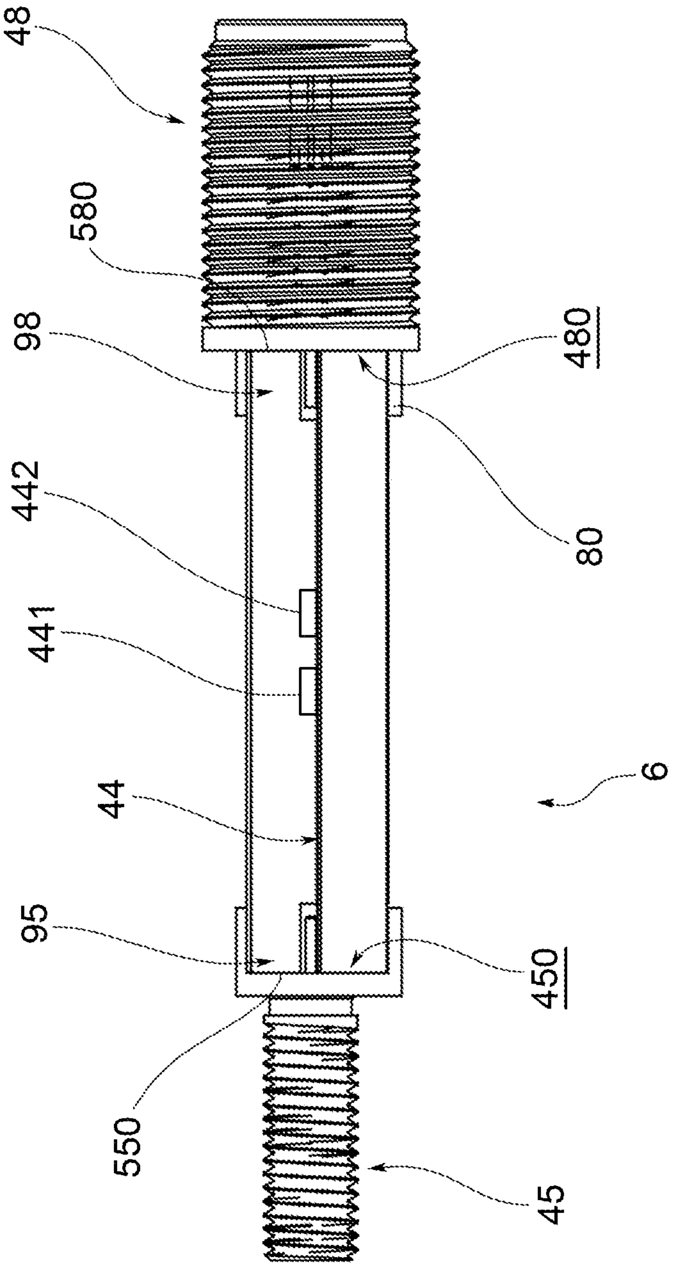
FIG. 5 is a longitudinal section view of a central assembly for an explosion-proof fitting for antennas made according to a further embodiment of the present invention.

Moreover, each capacitor preferably has a maximum tolerance of 10%. In an embodiment of the present invention, shown in FIG. 5, the capacitive blocking circuit 44 is only a series of capacitors 441, 442.

Preferably, the series of capacitors only consists of a series of two capacitors 441, 442, thus providing a more compact solution.

In a particularly advantageous embodiment, with reference to the embodiment shown in FIG. 3, the explosion-proof fitting 10 comprises a circuit board 60, including the capacitive blocking circuit 44. Preferably, the circuit board 60 is completely accommodated inside the shielding casing 5.

In a preferred embodiment, the circuit board 60 is a Printed Circuit Board, (PCB).

Even more preferably, the circuit board 60 is an insulated flexible support, preferably a support made of polyamide material, for example Kapton, and comprises a series of capacitors 441, 442, preferably directly obtained in the flexible support.

This provides a compact solution, further reducing the volume of the explosion-proof fitting 10.

Preferably, the capacitive blocking circuit 44 is electrically connected to the antenna attachment 48 at an antenna connection end 98 and is electrically connected to the radio attachment 45 at a radio connection end 95.

Moreover, the capacitive blocking circuit 44 is preferably accommodated inside the shielding casing 5 in a suspended manner, and is held in place in the shielding casing 5 only by means of the connection to the antenna attachment 48 at the antenna connection end 98 and to the radio attachment 45 at the radio connection end 95.

Preferably, the antenna attachment 48 comprises a first connection seat 480 at the antenna connection end 98 of the capacitive blocking circuit 44, and the radio attachment 45 comprises a second connection seat 450 at the radio connection end 95 of the capacitive blocking circuit.

In particular, the first and second connection seats 480, 450 each accommodate a respective engagement portion 580, 550 of the shielding casing.

Even more preferably, the first and second connection seats 480, 450 comprise coupling pins 80 which are firmly fastened, e.g., welded, to the respective engagement portion 580, 550 of the shielding casing 5.

In other words, the shielding casing 5 is directly fastened at the ends thereof (or more generally, at the ends of the capacitive blocking circuit 44) to radio attachment 45 and antenna attachment 48.

Moreover, the shielding casing 5 is preferably accommodated inside the cavity 36 in a suspended manner and is kept connected to the housing 30 only at the engagement portions 580, 550 engaged in the first and second connection seats 480, 450.

Figure 6A:
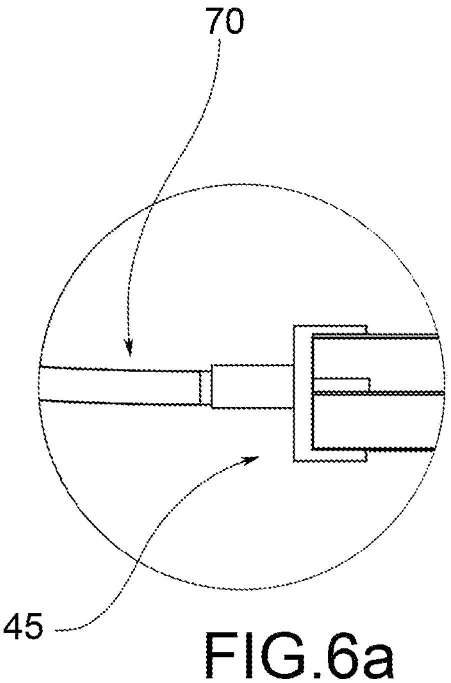
FIGS. 6*a* and 6*b* show two detailed views of a second end of a central assembly for an explosion-proof fitting for antennas, each seen in a different embodiment of the present invention.

In an embodiment, for example shown in FIG. 6*a*, the radio attachment 45 comprises a coaxial cable 70. The coaxial cable 70 preferably comprises a central conductor and a shield.

In an embodiment, the central conductor of the coaxial cable 70 is connected to (or it is) the electrical signal conductor 451, while the shield of the coaxial cable 70 is connected to the electrical return conductor 452.

Figure 6B:
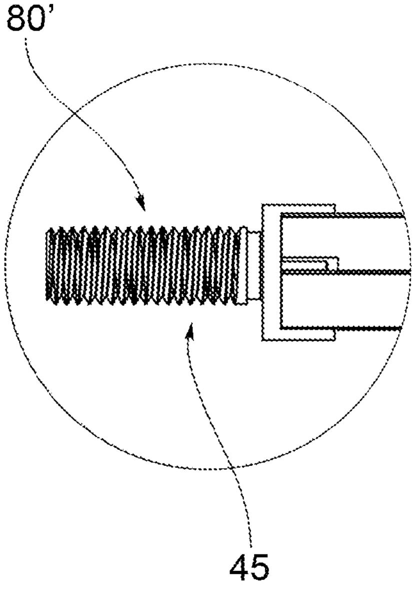

In a second embodiment, for example shown in FIG. 6*b*, the radio attachment 45 comprises a coaxial connector 80', protruding from the second end 34, which is adapted to receive a coaxial cable.

Figure 7A:
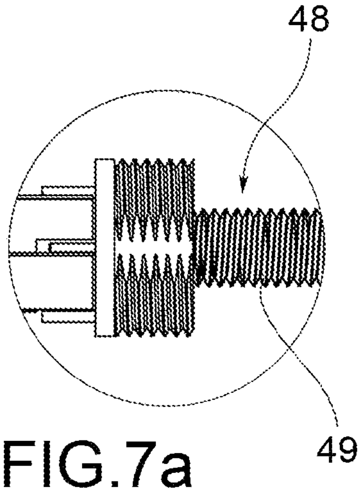
FIGS. 7*a*, 7*b* and 7*c* show three detailed views of an antenna attachment of a central assembly for an explosion-proof fitting for antennas, in three different embodiments of the present invention.

In a constructional variant, for example shown in FIG. 7*a*, the antenna attachment 48 has outer threads 49 and protrudes from the first end 32. The antenna attachment may be an SubMiniture version A (SMA) or Reverse Polarity-SubMiniture version A (RP-SMA) connector.

Figure 7B:
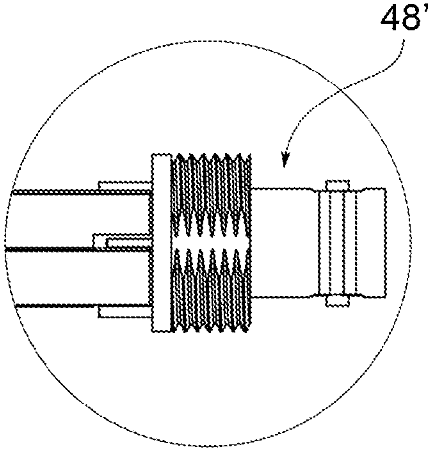

In an alternative constructional variant, for example shown in FIG. 7*b*, the antenna attachment 48 is a Bayonet Neill-Concelman-type (BNC-type) connector 48'.

Figure 7C:
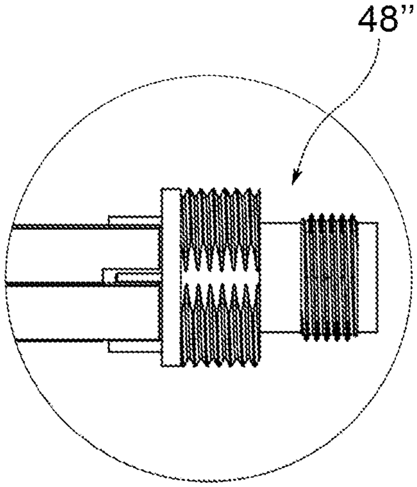

In a still alternative constructional variant, for example shown in FIG. 7*c*, the antenna attachment 48 is a Threaded Neill-Concelman-type (TNC-type) connector 48".

Preferably, the sealing compound 50 is a sealing compound for hazardous areas which acts as a dielectric, protects the central assembly 6 from humidity, potentially provides a traction release for the coaxial cable 70, and can withstand the force of an explosion.

Preferably, the sealing compound 50 is an epoxy compound, preferably an epoxy resin.

In an embodiment, the housing 30 further comprises an externally threaded portion 37, adjacent to the second end 34, and an integrally formed nut 39 adjacent to the first end 32. This configuration allows easy assembly on a casing or tube.

The housing 30 is preferably made of stainless steel 303 or 316 (Unified Numbering System (UNS) S30300 or UNS S31600).

It is apparent that a central assembly 6 for an explosion-proof fitting 10 for antennas is also a subject per se of the present invention.

According to the present invention, the central assembly 6 extends along a main extension axis X between an antenna attachment 48 and a radio attachment 45, and comprises:

a capacitive blocking circuit 44 electrically connected to the antenna attachment 48 and the radio attachment 45;

a shielding casing 5, running about the capacitive blocking circuit 44 along the main extension axis X and remaining spaced apart from the capacitive blocking circuit 44 at least along a transverse direction Y orthogonal to the main extension axis X, so that an interspace 7 between said shielding casing 5 and said capacitive blocking circuit 44 is formed.

According to the present invention, the central assembly 6 is housable in a cavity 36 of an explosion-proof fitting 10 for antennas.

It is also apparent that all the constructional variants described in the present disclosure relating to detailed technical features of the explosion-proof fitting 10 of the present invention, with particular reference to the detailed technical features of the elements of a central assembly 6, also equally apply to the central assembly 6 per se, irrespective of whether the central assembly 6 is accommodated in a cavity 36 of an explosion-proof fitting 10 or not.

As already mentioned, it is further apparent that the present invention is also directed to an explosion-proof box 14 for hazardous areas, comprising a containment wall 141 defining a safe area 142 on one side of the containment wall 141 and a hazardous area 143 on the other side of the containment wall 141. Moreover, the containment wall 141 comprises or defines a threaded opening 144 through the containment wall 141. Therefore, the explosion-proof box 14 comprises an explosion-proof fitting 10 for antennas as described in the preceding paragraphs and in particular coupled to the threaded opening 144, e.g., through the externally threaded portion 37 thereof.

Innovatively, the explosion-proof fitting for antennas according to the present invention allows overcoming all drawbacks of the explosion-proof fittings of the prior art. In particular, the explosion-proof fitting of the present invention is inherently protective and ensures the performance of the radio unit, minimizing the signal loss in the passage through the capacitive blocking circuit.

Innovatively, by virtue of the presence of the shielding casing, the explosion-proof fitting allows generating a signal shielding, while maintaining the sealing properties provided by the sealing compound.

Moreover, the explosion-proof fitting described generates little or even no alteration of the passive design filtering properties of the capacitive blocking circuit due to the presence of the shielding casing interposed between the capacitive blocking circuit and the sealing compound, thus avoiding the direct contact thereof.

According to a further synergistic advantage, the shielding casing consisting of a bendable metal sheet provides the explosion-proof fitting with a good shielding performance and acts as a ground for the circuit itself.

Moreover, according to an even further advantage, the metal sheet facilitates the operations of assembling the explosion-proof fitting, and is easily assemblable with the radio and antenna attachments, by virtue of the convenient prismatic shape.

Moreover, the explosion-proof fitting for antennas of the present invention is advantageously compact and easy to construct.

Moreover, the central assembly for an explosion-proof fitting for antennas of the present invention may be advantageously integrated with the housings for known explosion-proof fittings for antennas, i.e., no conversion is required for such housings to be adapted to the central assembly of the present invention.

Moreover, according to a further advantageous aspect, the central assembly of the present invention may also be used in applications in non-hazardous areas, e.g., inside multi-channel connectors for non-hazardous areas.

It is apparent that those skilled in the art may make changes to the embodiments of the aforesaid explosion-proof fitting for antennas, central assembly for an explosion-proof fitting, and explosion-proof box, or may replace elements with others which are functionally equivalent in order to meet specific needs.

Such variants are also within the scope of protection as defined by the following claims. Moreover, each variation described as belonging to a possible embodiment can be implemented irrespective of the other variations described.

What is claimed is:

1. An explosion-proof fitting for antennas, suitable for connecting an antenna in hazardous areas, the explosion-proof fitting comprising:

- a housing defining a first end and a second end and extending between the first and a second ends, the housing further defining a cavity between said first and second ends;
- an antenna attachment at said first end;
- a radio attachment at said second end;
- a central assembly extending along a main extension axis between said antenna attachment and said radio attachment, said central assembly being accommodated in said cavity and comprising:
- a capacitive blocking circuit electrically connected to said antenna attachment and said radio attachment;
- a shielding casing running about said capacitive blocking circuit along said main extension axis and remaining spaced apart from said capacitive blocking circuit at least along a transverse direction, orthogonal to said main extension axis, so that an interspace between said shielding casing and said capacitive blocking circuit is formed,
- said central assembly being accommodated in the cavity so that the shielding casing remains spaced apart from the housing,
- wherein the explosion-proof fitting comprises a sealing compound in the cavity, arranged between the shielding casing and the housing, said sealing compound at least partially or completely enclosing the central assembly.

2. The explosion-proof fitting for antennas of claim 1, wherein the central assembly is completely accommodated in the cavity.

3. The explosion-proof fitting for antennas of claim 1, wherein the interspace is filled with a gas, a gas mixture, or air.

4. The explosion-proof fitting for antennas of claim 1, further comprising a filling material accommodated in said interspace between said shielding casing and said capacitive blocking circuit.

5. The explosion-proof fitting for antennas of claim 4, wherein the filling material is polytetrafluoroethylene (Teflon).

6. The explosion-proof fitting of claim 4, wherein the filling material is selected from the group consisting of: polyethylene, polyamide, polypropylene, polystyrene, paper, mica, dioxide silicon, carbon sulfide, polyvinyl chloride (PVC), and bi-oriented polyethylene terephthalate (Bo-PET).

7. The explosion-proof fitting for antennas of claim 4, wherein the filling material totally occupies said interspace.

8. The explosion-proof fitting for antennas of claim 4, wherein the capacitive blocking circuit divides the interspace into a first half-space and a second half-space arranged on a side opposite to the first half-space with respect to the capacitive blocking circuit and wherein the filling material consists of at least a first slat arranged in the first half-space and a second slat arranged in the second half-space.

9. The explosion-proof fitting for antennas of claim 1, wherein the shielding casing is a bent metal sheet surrounding the capacitive blocking circuit.

10. The explosion-proof fitting for antennas of claim 1, further comprising a circuit board that comprises the capacitive blocking circuit, wherein said circuit board is completely contained in said shielding casing.

11. The explosion-proof fitting for antennas of claim 10, wherein the circuit board is an insulated flexible support and comprises a series of capacitors directly obtained in the flexible support.

12. The explosion-proof fitting for antennas of claim 11, wherein the insulated flexible support made is made of polyamide material.

13. The explosion-proof fitting for antennas of claim 12, wherein the polyamide material is Kapton.

14. The explosion-proof fitting for antennas of claim 1, wherein said sealing compound is for hazardous areas.

15. The explosion-proof fitting for antennas of claim 1, wherein the capacitive blocking circuit is electrically connected to said antenna attachment at an antenna connection end and to said radio attachment at a radio connection end, wherein the antenna attachment comprises a first connection seat at the antenna connection end, and wherein the radio attachment comprises a second connection seat at the radio connection end, said first and second connection seats each accommodating an engagement portion of the shielding casing.

16. The explosion-proof fitting for antennas of claim 15, wherein the first and second connection seats comprise coupling pins firmly fastened to said engagement portion of the shielding casing.

17. The explosion-proof fitting for antennas of claim 16, wherein the coupling pins are welded to said engagement portion of the shielding casing.

18. A central assembly for an explosion-proof fitting for antennas, extending along a main extension axis between an antenna attachment and a radio attachment, said central assembly comprising:

a capacitive blocking circuit electrically connected to said antenna attachment and said radio attachment;

a shielding casing running about said capacitive blocking circuit along said main extension axis and remaining spaced apart from said capacitive blocking circuit at least along a transverse direction orthogonal to said main extension axis, so that an interspace between said shielding casing and said capacitive blocking circuit is formed, said central assembly being accommodable in a cavity of the explosion-proof fitting for antennas.

19. An explosion-proof box for hazardous areas, comprising:

a containment wall defining a safe area on one side of said containment wall and a hazardous area on the other side of said containment wall, said containment wall further defining a threaded opening through said containment wall; and said explosion-proof fitting for antennas according to claim 1.

* * * * *